(12) United States Patent
Fischbach et al.

(10) Patent No.: US 6,984,121 B2
(45) Date of Patent: Jan. 10, 2006

(54) PLATEN FOR AN INJECTION MOLDING MACHINE, AND TWO-PLATEN INJECTION MOLDING MACHINE EQUIPPED WITH SUCH A PLATEN

(75) Inventors: Gunther Fischbach, Fürstenfeldbruck (DE); Klaus Becker, Wetter (DE); Guido Legewie, Herne (DE)

(73) Assignee: Mannesmann Plastics Machinery GmbH, München (DE)

(*) Notice: Subject to any disclaimer, the term of this patent is extended or adjusted under 35 U.S.C. 154(b) by 79 days.

(21) Appl. No.: 10/703,208

(22) Filed: Nov. 6, 2003
(Under 37 CFR 1.47)

(65) Prior Publication Data
US 2004/0131724 A1 Jul. 8, 2004

Related U.S. Application Data

(63) Continuation of application No. PCT/EP02/04913, filed on May 4, 2002.

(30) Foreign Application Priority Data
May 12, 2001 (DE) ................................ 101 23 104

(51) Int. Cl.
*B29C 45/64* (2006.01)
(52) U.S. Cl. ..................................... 425/595; 425/472
(58) Field of Classification Search ............... 425/589, 425/595, 451.9, 472; 100/295; 156/580
See application file for complete search history.

(56) References Cited

U.S. PATENT DOCUMENTS

| | | | |
|---|---|---|---|
| 4,726,754 A * | 2/1988 | Breuker et al. | 425/592 |
| 5,123,834 A * | 6/1992 | Joyner | 425/592 |
| 5,593,711 A | 1/1997 | Glaesener | |
| 6,027,329 A * | 2/2000 | Nazarian et al. | 425/451.9 |
| 6,171,097 B1 * | 1/2001 | Urbanek | 425/595 |
| 6,379,145 B1 * | 4/2002 | Urbanek | 425/595 |
| 6,439,876 B1 * | 8/2002 | Glaesener | 425/595 |
| 6,746,232 B2 * | 6/2004 | Becker et al. | 425/595 |

FOREIGN PATENT DOCUMENTS

| | | |
|---|---|---|
| DE | 201 14 341 U1 | 1/2002 |
| EP | 0 381 107 | 8/1990 |
| EP | 0 381 770 A1 | 8/1990 |
| EP | 0 747 196 A1 | 12/1996 |
| EP | 0 789 648 B1 | 8/1997 |
| WO | WO 98/41380 | 9/1998 |

* cited by examiner

Primary Examiner—James P. Mackey
(74) Attorney, Agent, or Firm—Henry M. Feiereisen

(57) ABSTRACT

A platen of an injection molding machine includes a plate-shaped center area having corners, each corner formed with a recess. A plurality of sleeves is received in the recesses of the center area and defines bores for accommodation of column-like holding and/or guide elements. The sleeves have an outer surface in confronting relationship to the center area and are configured for only partial connection to the center area, thereby establishing an elastic connection between the center area and the sleeves.

22 Claims, 3 Drawing Sheets

PLATEN FOR AN INJECTION MOLDING MACHINE, AND TWO-PLATEN INJECTION MOLDING MACHINE EQUIPPED WITH SUCH A PLATEN

CROSS-REFERENCES TO RELATED APPLICATIONS

This application is a continuation of prior filed copending PCT International application no. PCT/EP02/04913, filed May 4, 2002, which designated the United States and on which priority is claimed under 35 U.S.C. §120, the disclosure of which is hereby incorporated by reference.

This application claims the priority of German Patent Application, Serial No. 101 23 104.0, filed May 12, 2001, pursuant to 35 U.S.C. 119(a)–(d), the disclosure of which is incorporated herein by reference.

BACKGROUND OF THE INVENTION

The present invention relates to a platen of an injection molding machine. The present invention further relates to a two-platen injection machine equipped with such a platen.

U.S. Pat. No. 5,593,711 discloses a platen for use in a plastics injection molding machine, with the platen including a base plate, a frustoconical center part, and a front plate in parallel relationship to the base plate for carrying a molding tool. The base plate has corners formed with bores for receiving tie bars. The center part is hollow and has a base disposed at a central location of the base plate, with the front plate situated upon the truncated top of the center portion. The front plate is thus supported solely in midsection by the center part. In this way, the front plate is presumed to remain planar, when a clamping force is applied so as to prevent an opening of the half-molds of the molding tool.

European Pat. No. EP 0 789 648 B1 discloses an injection molding machine with a generally C-shaped machine frame with two frame limbs in the absence of interconnecting tie bars. Supported by one limb is a fixed platen, while the other limb has mounted thereto a flange plate of a clamping unit. The clamping unit includes a hydraulic piston and cylinder unit to displace the moving platen, supported by the machine frame. The flange plate and the fixed platen are secured via so-called holding elements to the limbs of the machine frame. During closing operation, the holding elements of the flange plate are exposed to a tensile load while the fixed platen is loaded by a compressive force. The holding elements resemble the operation of springs whose elasticity is smaller than that of the machine frame. The holding elements are distributed over the vertical dimension of the fixed platen and the flange plate and exhibit different elasticity, whereby the lower holding elements have a greater elasticity than the upper holding portions. The holding portions are made of spring steel and are formed with slots for effecting material weakenings. The lower portion includes hereby several or deep slots to enhance the elasticity. When pushing the frame limbs of the machine frame apart at the top during the injection operation, the fixed platen and the flange plate can undergo a tilting movement relative to the machine frame to thereby maintain parallelism of the platens. The holding elements thus form an axis-less hinge which besides the rotary movement also permit a translatory movement.

European Pat. No. EP 0 381 107 B1 discloses a clamping unit for a horizontal two-platen injection molding machine for plastics. The injection molding machine includes a fixed platen and a moving platen for carrying confronting half-molds. The fixed platen has a rectangular shape and is connected with the moving platen by spindles arranged at the four corners or an imaginary tetragon. The spindles are hereby arranged non-rotatably and cantilevered on the fixed platen. The moving platen is displaceable in the direction of the fixed platen along the spindles at the corners for opening and closing the half-molds. Mounted on each spindle on a side of the moving platen distal to the half-mold is a spindle nut for operation of the moving platen. The spindle nuts are rotated together by an electric motor and configured as a ball screw nut. After closing the half-molds, a clamping force is applied upon the half-molds by a hydraulic piston and cylinder unit which act on the spindles and spindle nuts and include an annular piston through which the respective spindle is guided. To prevent opening of the half-molds after injection operation, the piston and cylinder unit is double-acting. A tilting or deformation of the platens during application of the clamping force is accompanied by a bending of the spindles which are thus subject to increased wear, ultimately resulting in their destruction.

It would therefore be desirable and advantageous to provide an improved platen and improved two-platen injection molding machine to obviate prior art shortcomings and to be of simple construction and yet enabling an elastic securement for a connection of the platen to a holding and/or guiding element.

SUMMARY OF THE INVENTION

According to one aspect of the present invention, a platen of an injection molding machine includes a plate-shaped center area having corners, each corner formed with a recess; and a plurality of sleeves received in the recesses of the center area and defining bores for accommodation of column-like holding and/or guide elements, whereby the sleeves and the recesses are placed into one-to-one correspondence, wherein the sleeves have an outer surface in confronting relationship to the center area and configured for only partial connection to the center area.

The present invention resolves prior art problems by providing an elastic connection between the center area and the sleeve through separation of the stiff center area from the elastic, quasi resilient support of the sleeves in the center area. The elastic connection can be implemented by providing between the center area and the sleeves a transition zone which is comprised of an annular gap to define a clearance between the center area and the sleeves and an annular bridge to connect the sleeves to the center area. Suitably, the ring-shaped gap has a depth which is greater than half a thickness of the center area, thereby enabling an adjustment of the desired elasticity.

According to another feature of the present invention the center area and the sleeves may be made in one piece, suitably of cast steel or gray cast iron. In this way, the platen can be made in a simple manner.

According to another feature of the present invention, the center area may be of generally rectangular shape, and may have a substantially star-shaped or cross-shaped configuration, whereby the sleeves project beyond the bores and have an outer perimeter which is connected to an adjacent rim zone of the center area by a stay. As a clamping force is applied, the stays are subjected to torsion and bending. The stays may have a wedge-shaped configuration and can be connected with the adjacent rim zone across an entire thickness of the center area and length of the sleeve.

A platen according to the present invention is especially useful for plastics injection molding machines without tie bars, whereby the platens are connected via the holding and/or guiding elements, placed in the openings of the sleeves, with the normally U-shaped machine frame. This type of suspension of the platen in the form of an axis-less hinge effectively prevents the limb of the U-shaped machine frame to give way, when subjected to the clamping force, and thus maintains a parallelism of the platens.

According to another aspect of the present invention, a two-platen injection molding machine includes a machine frame, a fixed plated mounted to the machine frame and carrying a half-mold, a moving platen carrying another half-mold, a clamping unit including a plurality of spindle mechanisms, each having a spindle extending between the fixed and moving platens, for displacing the moving platen in a direction of the fixed platen, wherein each of the fixed and moving platens includes a plate-shaped center area having corners, each corner formed with a bore, and a plurality of sleeves received in the bores of the center area, whereby the sleeves and the bores are placed into one-to-one correspondence, wherein the sleeves have an outer surface in confronting relationship to the center area and configured for only partial connection to the center area.

According to another feature of the present invention, the spindles may be positioned in the corners of the fixed platen, so that a total of four spindles may be provided to extend in the direction of the moving platen through the corners of the moving platen for connection to associated spindle nuts of the spindle mechanisms. These spindle nuts are rotatable by a drive unit in order to open or close the half-molds, mounted to the platens.

According to another feature of the present invention, the moving platen may be supported by two bearings upon the machine frame. Suitably the bearings are constructed as support rollers which are arranged on the underside of the moving platen in the lateral peripheral zones, respectively.

Suitably, the spindle mechanisms are constructed as ball screw mechanisms. This is desired because they run substantially free of friction and thus generate little noise and require little maintenance.

According to another feature of the present invention, the clamping unit may include a piston and cylinder unit for applying a clamping force onto the half-molds. In this way, the spindle mechanisms are used exclusively for opening and closing the half-molds and not required to apply the required clamping force.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
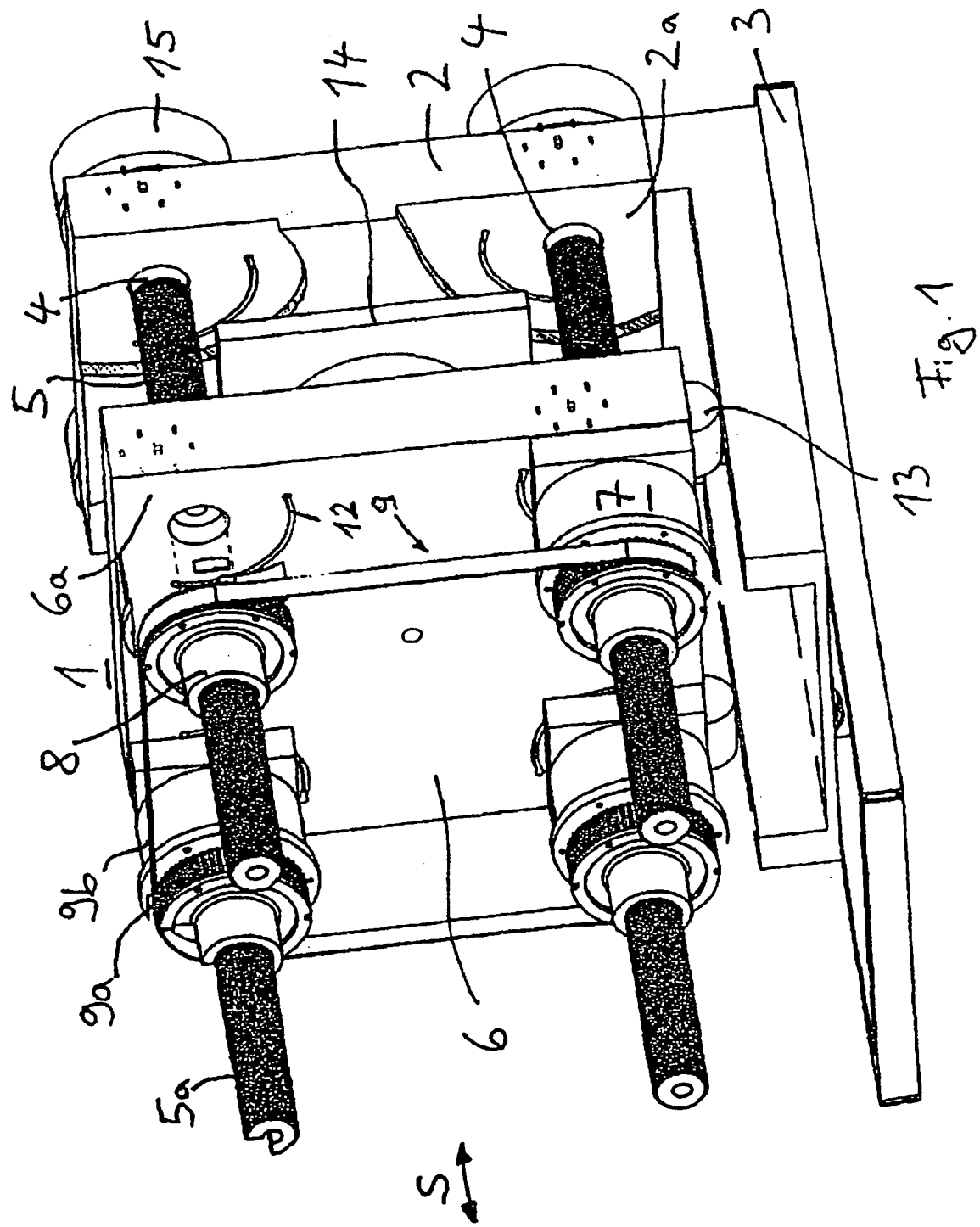
FIG. 1 is a schematic perspective view of a clamping unit of a horizontal two-platen injection molding machine, having incorporated therein the subject matter according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic perspective view of a clamping unit 1 of a horizontal two-platen injection molding machine for plastics. The injection molding machine includes a machine bed 3, a fixed platen 2, which is secured upright onto the machine bed 3 and carries a half-mold of a molding tool 14, and a moving platen 6 displaceable in relation to the fixed platen 2 and carrying another half-mold of the molding tool 14. The fixed platen 2 has a generally block-shaped configuration, approximately square in shape, and has corners 2a which are each formed with a bore 4 for receiving a spindle 5. As shown on the right-hand side of FIG. 1, each spindle 5 is non-rotatably connected on the backside of the fixed platen 2 via a detachable fastening element 15 with the fixed platen 2.

The four spindles 5 extend cantilevered and substantially a right angle to the fixed platen 2. As the fixed platen 2 is essentially aligned in vertical direction, the spindles 5 thus extend horizontal. At its front side confronting the moving platen 6, the fixed platen 2 carries the half-mold of the molding tool 14 in a space between the spindles 5. The spindles 5 extend through bores in the corners 6a of the moving platen 6 and jut out with their spindle ends 5a for connection to a spindle mechanism, generally designated by reference numeral 7. For sake of illustration, the spindle mechanism 7 at the upper right-hand side on the moving platen 6 has been partially broken away to show internal components which will be described furtherbelow.

Each spindle mechanism 7 includes a spindle nut 8 which is rotatably supported on the backside of the moving platen 6 and is in meshed engagement with the spindle 5. The spindle nut 8 is suitably constructed as a ball screw nut. Opening and closing of the half-molds and thus displacement of the moving platen 6 along the spindles 5 in the direction of the fixed platen 2 is implemented by a drive unit, generally designated by reference numeral 9 and operatively connected to the spindle nuts 8. The drive unit 9 is constructed as a belt drive including a belt 9b which is trained about rotatable pulleys 9a disposed in concentric relationship to the spindles 5 in the area of the drive mechanisms 7 and operatively connected with the spindle nuts 8. As all four pulleys 9a are driven by the common belt 9b, the spindle mechanisms 7 and thus the moving platen 6 run in synchronism.

As further shown in FIG. 1, the moving platen 6 is rollingly supported via two support rollers 13 on the machine bed 3. The support rollers 13 are supported on the underside of the moving platen 6 via horizontal axles which extend transversely to a movement direction S of the platen 6. Suitably, the support rollers 13 are disposed at the lateral peripheral zone of the moving platen 6.

Figure 2:
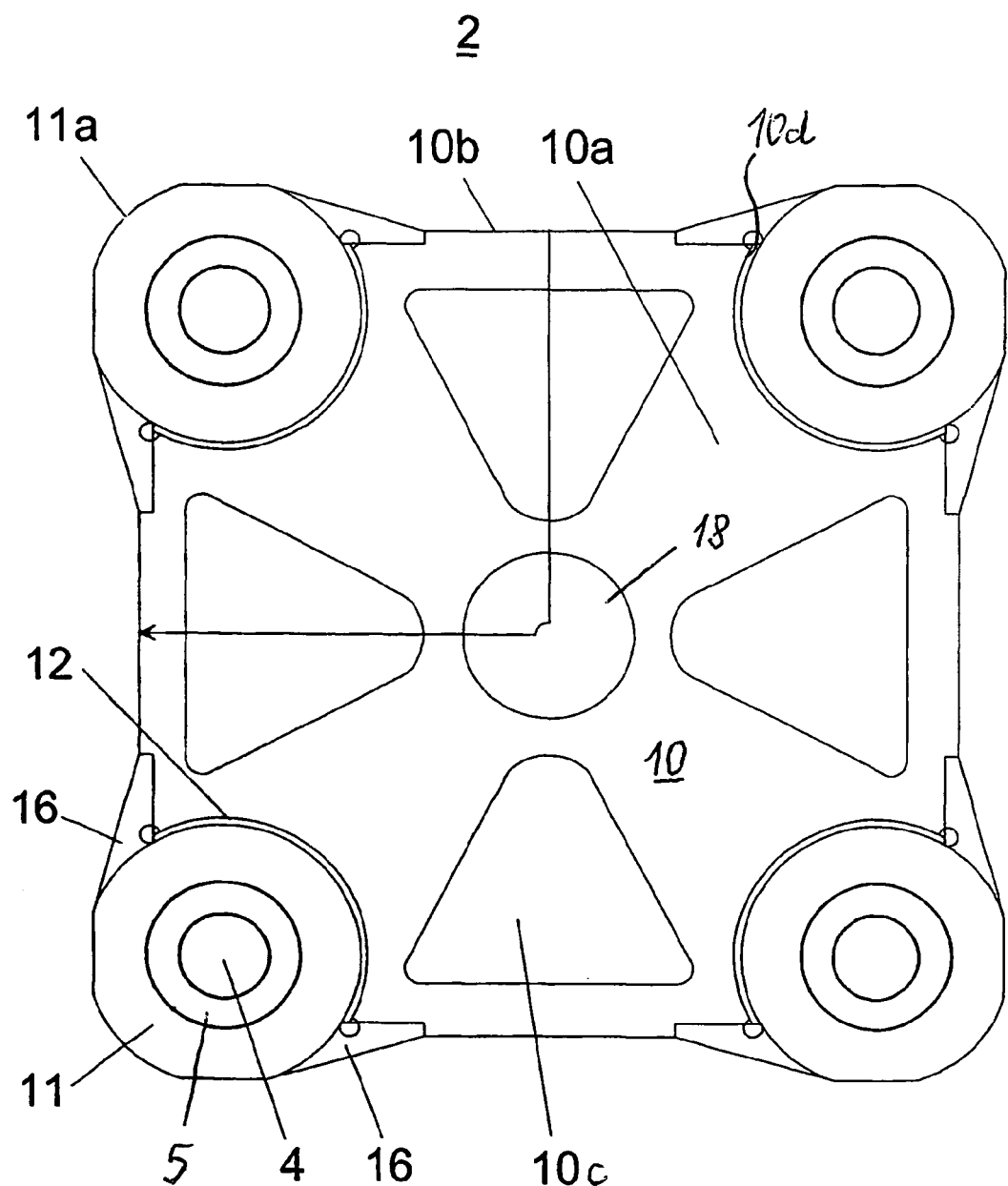
FIG. 2 is a frontal view of a platen according to the invention.

Turning now to FIG. 2, there is shown a frontal view of one of the platens, 2, 6, here, by way of example, the fixed platen 2. As the platens 2 and 6 are essentially of identical construction, except for their support on the machine bed 3, it will be understood by persons skilled in the art that a description of one of the platens is equally applicable to the other platen. The platen 2 has a block-shaped, substantially rectangular, configuration with a substantially cross-shaped center area 10 with four circular recesses 10d. The center area 10 is of light-weight construction and has a base board 10c which is reinforced by a rib structure 10a. Disposed in the recess 10d of each of the four corners is a sleeve 11 to form the bores 4 for receiving the column-like holding and/or guide elements. In the non-limiting example of FIG. 2, the column-like holding and/or guide elements are represented by the spindles 5 which extend through the bores 4 of the sleeves 11 of the platen 2 and extend through the bores 4 of the sleeves 11 of the moving platen 6 for connection with the respective spindle nut 8 of the spindle mechanism 7 adjacent the sleeve 11.

Figure 3:
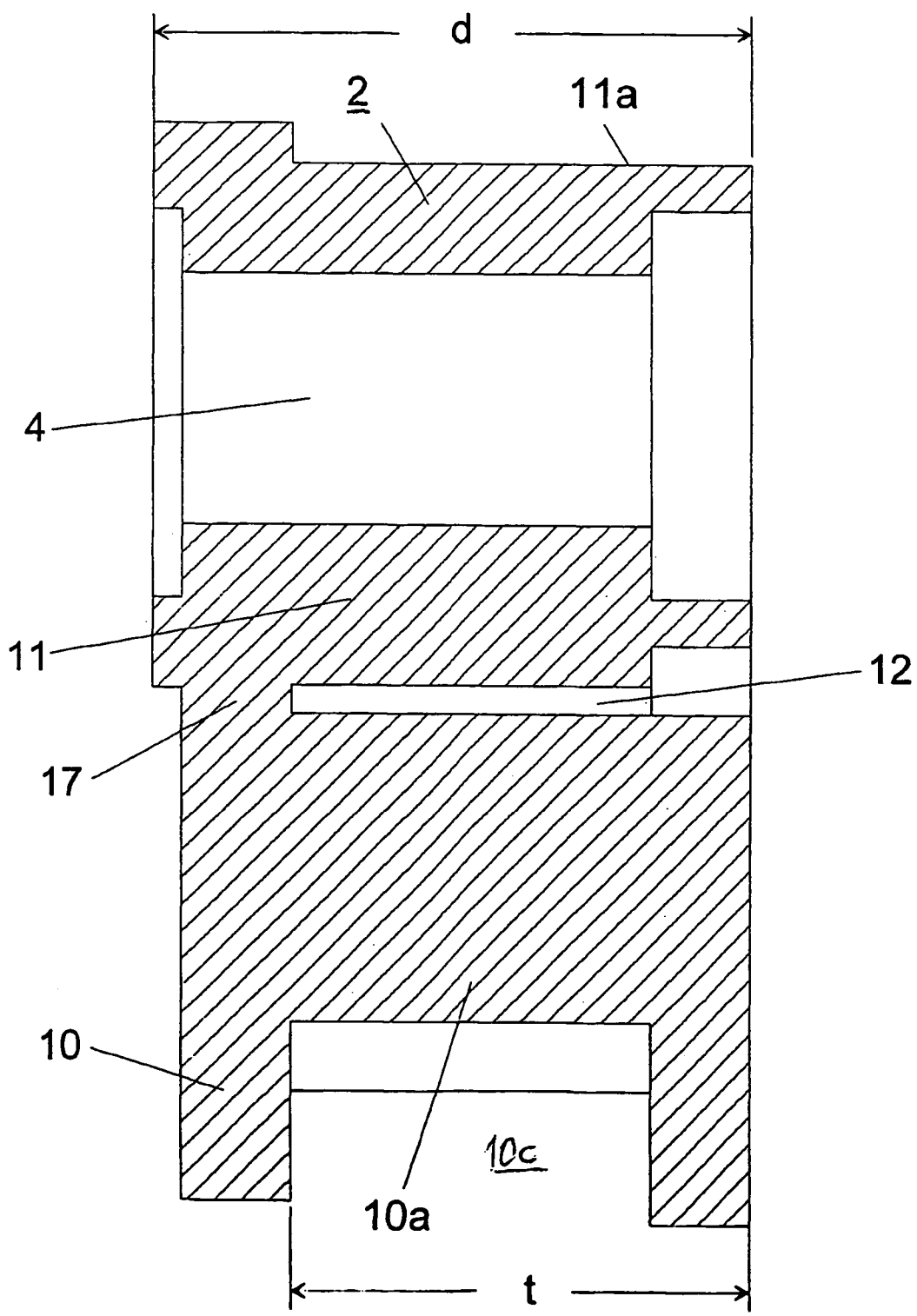
FIG. 3 is a side view of the platen of FIG. 2 in an area of a sleeve.

As shown in FIG. 2, the sleeves 11 are received within the recesses 10d at a clearance about a portion thereof to define an annular, sickle-shaped gap 12 and to separate the sleeve 11 from the center area 10, except for a ring-shaped bridge 17 that connects the sleeve 11 to the central area 10, as shown in particular in FIG. 3. The angular length of the circular ring-shaped gap 12 in relation to the center point of the sleeve is about 110°. The gap 12 terminates in the peripheral zone of the center area 10 of the platen 2. FIG. 3 in concert with FIG. 2 show the disposition of the annular gaps 12 on the platens 2, 6 of the two-platen injection molding machine on the sides facing away from one another. In FIG. 1, the area of the sleeves 11 of the platen 2 is broken away here to show the respective gap 12. Suitably, the annular gap 12 has a depth T which is greater than half a thickness of the center area 10, preferably about ⅘ of the thickness d of the center area 10.

The sleeves 11 are only partially received in the recesses 10d of the center area 10 and project beyond the center area 10 by about a third of their diameter. As shown in FIG. 2, the sleeves 11 are further connected to the lateral edge 10b of the center area 10 by stays 16. Each sleeve 11 is hereby provided with two stays 16 of generally wedge-shaped configuration to connect the outer surface 11a of the sleeve 11 with the edge 10b of the center area. The outer side of the stay 16 terminates hereby tangentially into the outer surface 11a of the sleeves. The stay 16 extends substantially across the entire thickness d of the platen 2 and the opposite area of the outer surface 11a. Each sleeve 11 is thus connected with the center area 10 by a ring-shaped bridge 17 that remains at the root of the ring-shaped gap 12 and the two stays 16 disposed laterally to the bridge 17.

The center area 10 is further provided with an aperture 18 for insertion of an injection unit (not shown) to connect to the molding tool 14.

The configuration of the platens 2, 6 with the rib structure 10 and the sleeves 11, connected to the center area 10 via the stays 16 and the ring-shaped bridge 17, is especially suitable for realizing a single-piece construction of casting material, e.g. cast steel or gray cast iron. In this way, the platen 2, 6 is lightweight and easy to manufacture. In addition, the center area 10 is formed with holes 10c to further contribute to the lightweight character of the platen.

The stays 16 and the ring-shaped bridge 17 define an elastically yielding connection between the sleeves 11 and the center area 10 so that a transmission of deflections of the platens 2, 6 as a consequence of the applied clamping force to the sleeves is greatly reduced. The stays 16 and the bridge 17 are hereby subjected to torsion and bending. As a result, the spindle mechanisms 7 and the spindles 5 are subjected to little bending stress so that parallelism between the platens 2, 6 is maintained and overly stressing of the spindle mechanisms 7 as well as the spindles 5 is avoided.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A platen of an injection molding machine, comprising:
    a stiff plate-shaped center area having corners, each corner formed with a recess; and
    a plurality of sleeves received in the recesses of the center area and defining bores for accommodation of column-like holding and/or guide elements, whereby the sleeves and the recesses are placed into one-to-one correspondence, wherein the sleeves have an outer surface in confronting relationship to the center area and configured for only partial connection to the center area to thereby realize a resilient support of the sleeves in the corners.

2. The platen of claim 1, wherein the center area and the sleeves are made in one piece.

3. The platen of claim 1, wherein the center area and the sleeves are made of cast steel or gray cast iron.

4. The platen of claim 1, wherein the center area defines with each of the sleeves a transition zone comprised of a ring-shaped gap and a ring-shaped bridge.

5. The platen of claim 4, wherein the ring-shaped gap has a depth which is greater than half a thickness of the center area.

6. The platen of claim 4, wherein the ring-shaped gap has a depth which is ⅘ of a thickness of the center area.

7. The platen of claim 1, wherein the center area has a generally rectangular configuration.

8. The platen of claim 1, wherein the center area has a substantially star-shaped or cross-shaped configuration, each of said sleeves projecting beyond the bore and having an outer perimeter, and further comprising a stay for connecting the outer perimeter of the sleeve to an adjacent rim zone of the center area.

9. The platen of claim 8, wherein the stay has a wedge-shaped configuration and is connected to the adjacent rim zone across an entire thickness of the center area and a length of the sleeve.

10. A two-platen injection molding machine, comprising:
    a machine frame;
    a fixed plated mounted to the machine frame and carrying a half-mold;
    a moving platen carrying another half-mold;
    a clamping unit including a plurality spindle mechanisms, each including a spindle extending between the fixed and moving platens, for moving the moving platen in a direction of the fixed platen;
    wherein each of the fixed and moving platens includes a plate-shaped center area having corners, each corner formed with a recess, and a plurality of sleeves received in the recesses of the center area and defining bores for accommodation of column-like holding and/or guide elements, whereby the sleeves and the recesses are placed into one-to-one correspondence, wherein the sleeves have an outer surface in confronting relationship to the center area and configured for only partial connection to the center area.

11. The injection molding machine of claim 10, wherein the fixed and moving platens are generally rectangular in shape.

12. The injection molding machine of claim 10 wherein the spindles are positioned in the corner areas of the fixed platen and extend in the direction of the moving platen through the corner areas of the moving platen for connection to spindle nuts of the spindle mechanisms, and further comprising a drive unit for operating the spindle mechanisms.

13. The injection molding machine of claim 10, wherein the spindle mechanisms are configured as ball screw mechanism.

14. The injection molding machine of claim 10, wherein the clamping unit includes a piston and cylinder unit for applying a clamping force onto the half-molds.

15. The injection molding machine of claim 10, and further comprising a bearing unit for supporting the moving platen upon the machine frame.

16. The injection molding machine of claim 15, wherein the bearing unit includes two support rollers arranged on an underside of the moving platen in lateral peripheral zones thereof.

17. A platen of an injection molding machine, comprising:
a stiff center area having a corner formed with a recess; and
a sleeve defining an interior bore for receiving a holding element, said sleeve having an outer surface in confronting relationship to the center area and so received in the recess of the center area that a first portion of the outer surface extends at a clearance to the center area to form a ring-shaped gap, and a second portion is connected to the center area to thereby realize a resilient support of the sleeve in the corner.

18. The platen of claim 17, wherein the gap has an angular length of about 110°.

19. The platen of claim 17, wherein the first portion has a depth which is greater than half a thickness of the center area.

20. The platen of claim 17 wherein the first portion has a depth which is $4/5$ of a thickness of the center area.

21. The platen of claim 17, and further comprising a stay for connecting the sleeve, outside the outer surface, to an adjacent rim zone of the center area.

22. The platen of claim 21, wherein the stay has a wedge-shaped configuration and has a width corresponding to an axial length of the sleeve.

* * * * *